United States Patent
Kaku et al.

(10) Patent No.: US 11,012,172 B2
(45) Date of Patent: May 18, 2021

(54) RELAY DEVICE

(71) Applicant: DENSO CORPORATION, Kariya (JP)

(72) Inventors: Yoshifumi Kaku, Kariya (JP); Eiichiro Kusano, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 16/382,348

(22) Filed: Apr. 12, 2019

(65) Prior Publication Data

US 2019/0356404 A1     Nov. 21, 2019

(30) Foreign Application Priority Data

May 15, 2018 (JP) .............................. JP2018-093727

(51) Int. Cl.
*H04J 3/06* (2006.01)
*H04L 12/863* (2013.01)
*H04L 12/721* (2013.01)

(52) U.S. Cl.
CPC .......... *H04J 3/0673* (2013.01); *H04J 3/0661* (2013.01); *H04L 45/66* (2013.01); *H04L 47/623* (2013.01)

(58) Field of Classification Search
CPC ..... H04J 3/0673; H04J 3/0661; H04L 47/623; H04L 47/622; H04L 47/627; H04L 47/50; H04L 47/6215; H04L 47/6295; H04L 45/66
See application file for complete search history.

(56) References Cited

U.S. PATENT DOCUMENTS

| 10,084,559 | B1* | 9/2018 | Devineni | H04J 3/0697 |
| 2007/0008993 | A1* | 1/2007 | Cha | H04J 3/0682 370/509 |
| 2014/0294021 | A1* | 10/2014 | Jobert | H04J 3/0667 370/503 |
| 2016/0173395 | A1* | 6/2016 | Danielsson | H04L 47/28 370/236 |
| 2017/0118141 | A1* | 4/2017 | Alsup | H04L 49/251 |
| 2018/0287725 | A1* | 10/2018 | Rabinovich | H04J 3/0667 |

FOREIGN PATENT DOCUMENTS

| JP | 2017-208743 A | 11/2017 |
| WO | 2017/038351 A1 | 3/2017 |

OTHER PUBLICATIONS

Messenger et al, 802.1Q Forwarding PTP messages in an IEEE Transparent Clock, Adva Optical Networking, Nov. 2012 (Year: 2012).*

* cited by examiner

*Primary Examiner* — Kent Krueger
(74) *Attorney, Agent, or Firm* — Posz Law Group, PLC

(57) ABSTRACT

A relay device accumulates received frames that are not determined as a specific frame in a queue and transfers the frames accumulated in the queue one by one according to a predetermined rule. The relay device transfers a received frame that is determined as a specific frame priority to the frames accumulated in the queue without accumulating the specific frame in the queue.

7 Claims, 4 Drawing Sheets

RELAY DEVICE

CROSS REFERENCE TO RELATED APPLICATION

The present application claims the benefit of priority from Japanese Patent Application No. 2018-93727 filed on May 15, 2018. The entire disclosure of the above application is incorporated herein by reference.

TECHNICAL FIELD

The present disclosure relates to a relay device.

BACKGROUND

In an in-vehicle communication system in which a plurality of in-vehicle units communicate with each other, a time synchronization frame is used for time synchronization between the plurality of in-vehicle units. The time synchronization frame is transmitted from a first unit to a second unit via a relay device.

SUMMARY

The present disclosure provides a relay device that accumulates received frames not determined as a specific frame in a queue and transfers the frames accumulated in the queue one by one according to a predetermined rule. The relay device transfers a received frame that is determined as a specific frame priority to the frames accumulated in the queue without accumulating the specific frame in the queue.

BRIEF DESCRIPTION OF DRAWINGS

Additional objects and advantages of the present disclosure will be more readily apparent from the following detailed description when taken together with the accompanying drawings. In the drawings.

DETAILED DESCRIPTION

Figure 1:
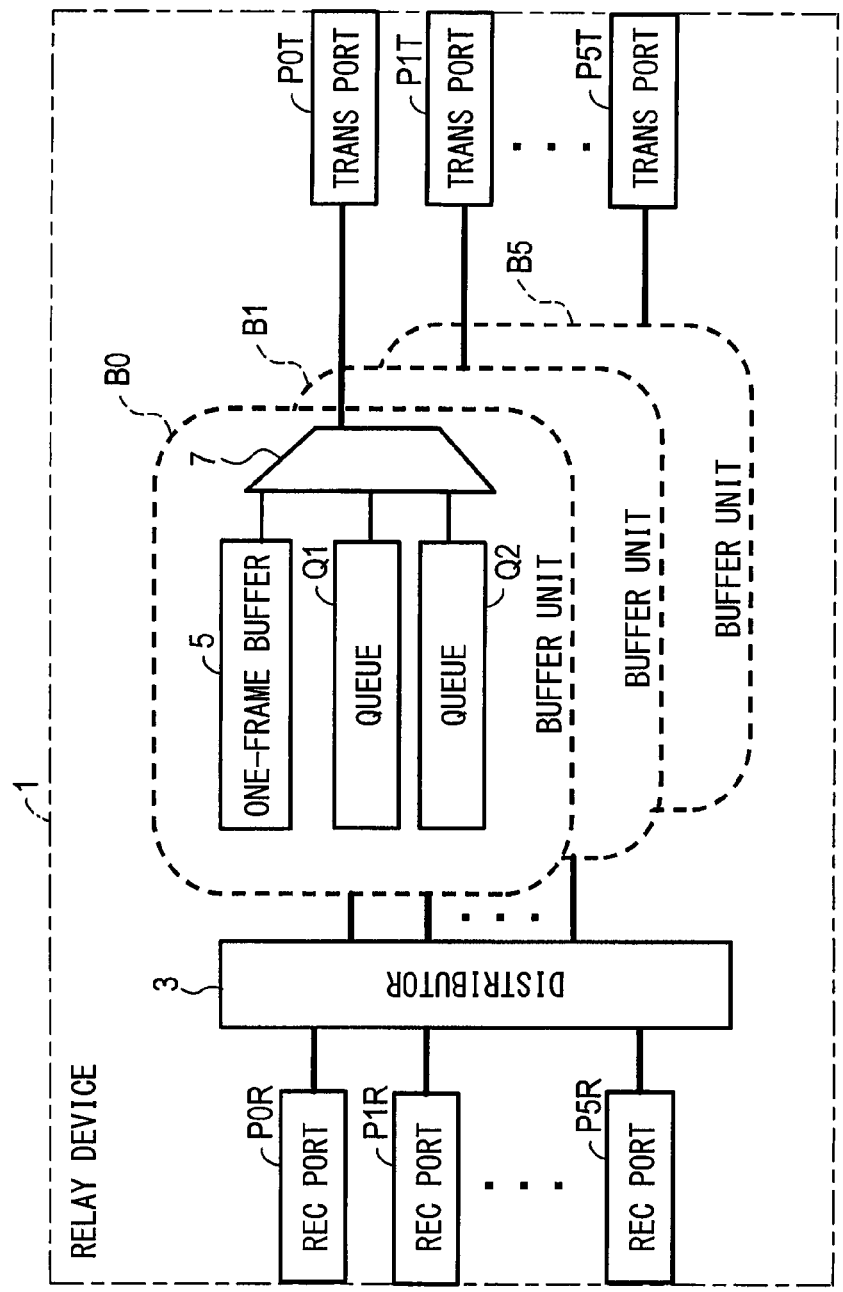
FIG. 1 is a block diagram showing a configuration of a relay device according to an embodiment.

In an in-vehicle communication system, a time synchronization frame is an example of frames for which it is desirable to restrict variation in transfer delay time. The following describes an example of an application of the time synchronization frame. A time synchronization frame that includes a time stamp indicating a current time is transmitted from a first unit to a second unit via a relay device, and the second unit recognizes the current time from the time stamp in the received time synchronization frame.

In a related art, a priority of a received data is determined from a vehicle state, and a data monitoring method according to the determined priority is executed.

As a result of detailed examination by the inventors, the following difficulties were found. In the above-described example, if a transfer delay time of the time synchronization frame is constant, the second unit can recognize a correct time by correcting a time indicated by the time stamp in the received time synchronization frame by the amount of the transfer delay time. That is, time synchronization between the first unit and the second unit is correctly performed. However, in the relay device, the transfer delay time of the time synchronization frame varies depending on the amount of frames accumulated in a queue by other communication. Thus, correct time synchronization between the first unit and the second unit becomes difficult.

A relay device according to an aspect of the present disclosure is configured to transfer a plurality of frames that is received, and includes a queue, an accumulation execution unit, a first transfer unit, a determination unit, and a second transfer unit.

The accumulation execution unit accumulates the plurality of frames that is received in the queue. The first transfer unit transfers the plurality of frames accumulated in the queue one by one according to a predetermined rule.

The determination unit determines whether each of the plurality of frames that is received is a specific frame. The second transfer unit prohibits the accumulation execution unit from accumulating a frame determined as the specific frame by the determination unit (that is, the specific frame) in the queue, and transfers the specific frame priority to the plurality of frames accumulated in the queue.

According to such a configuration, a variation in transfer delay time of the specific frame can be restricted. Since the plurality of frames other than the specific frame is accumulated in the queue and then transferred, a transfer delay time of the plurality of frames other than the specific frame may vary depending on the amount of frames accumulated in the queue. On the other hand, since the specific frame is immediately transferred without being accumulated in the queue, the variation in transfer delay time of the specific frame can be restricted.

A relay device according to another aspect of the present disclosure includes a reception port, a transmission port, a queue, a processor, and a non-transitory tangible storage medium. The reception port is configured to receive a plurality of frames from a first electronic control unit. The transmission port is configured to transfer the plurality of frames to a second electronic control unit. The queue is connected between the reception port and the transmission port. The non-transitory tangible storage medium stores a program that instructs the processor to receive the plurality of frames from the reception port, determine whether each of the plurality of frames is a time synchronization frame, accumulate the plurality of frames other than the time synchronization frame in the queue, transfer the time synchronization frame from the transmission port priority to the plurality of frames accumulated in the queue without accumulating the time synchronization frame in the queue, and transfer the plurality of frames accumulated in the queue from the transmission port one by one according to a predetermined rule.

Hereinafter, embodiments of the present disclosure will be described with reference to the drawings.

1. Configuration

As shown in FIG. 1, a relay device 1 according to an embodiment of the present disclosure includes a plurality of reception ports (REC PORT) P0R-P5R to which a plurality of frames is respectively input and a plurality of transmission ports (TRANS PORT) P0T-P5T from which the plurality of frames is respectively output. In the present embodiment, the number of the reception ports and the number of the transmission ports are respectively six. However, the number of the reception ports and the number of the transmission ports may be other than six. The number of the reception ports and the number of the transmission ports may be different from each other.

Each of the reception ports P0R-P5R and the transmission ports P0T-P5T is connected to one of a plurality of electronic control units (ECUs) mounted on a vehicle through a relay device having the same configuration as the relay device 1 or without through a relay device. The reception ports P0R-P5R receive frames transmitted from the ECUs connected to the reception ports P0R-P5R. The relay device 1 outputs the frames input to the reception ports P0R-P5R, that is, the frames received from the reception ports P0R-P5R, from the transmission ports P0T-P5T to which the ECUs of destinations of the frames are connected. In the present embodiment, the frames are frames based on a standard of Ethernet (registered trademark), that is, Ethernet frames.

The relay device 1 further includes a distributor 3 and buffer units B0-B5 corresponding to the transmission ports P0T-P5T, respectively. Each of the buffer units B0-B5 includes a first queue Q1, a second queue Q2, a one-frame buffer 5, and a scheduler 7.

Each of the queues Q1 and Q2 has a capacity capable of accumulating a plurality of frames. In each of the queues Q1 and Q2, frames output (that is, transferred) from the transmission port corresponding to the buffer unit provided with the queues Q1 and Q2 are stored.

The one-frame buffer 5 has a capacity capable of storing one frame. In the one-frame buffer 5, a specific frame among the frames transferred from the transmission port corresponding to the buffer unit provided with the one-frame buffer 5 is stored.

Further, among the frames relayed by the relay device 1, at least two levels of priority are set to frames other than the specific frame. Then, the frame with higher priority is stored in the first queue Q1, and the frame with lower priority is stored in the second queue Q2.

The distributor 3 determines the transfer destination ports of the frames received from the reception ports P0R-P5R, that is, which transmission ports P0T-P5T to transfer the frames, and distributes the frames to the queues Q1, Q2 and the one-frame buffer 5. The scheduler 7 transfers the frames from the queues Q1, Q2 and the one-frame buffer 5.

Figure 5:
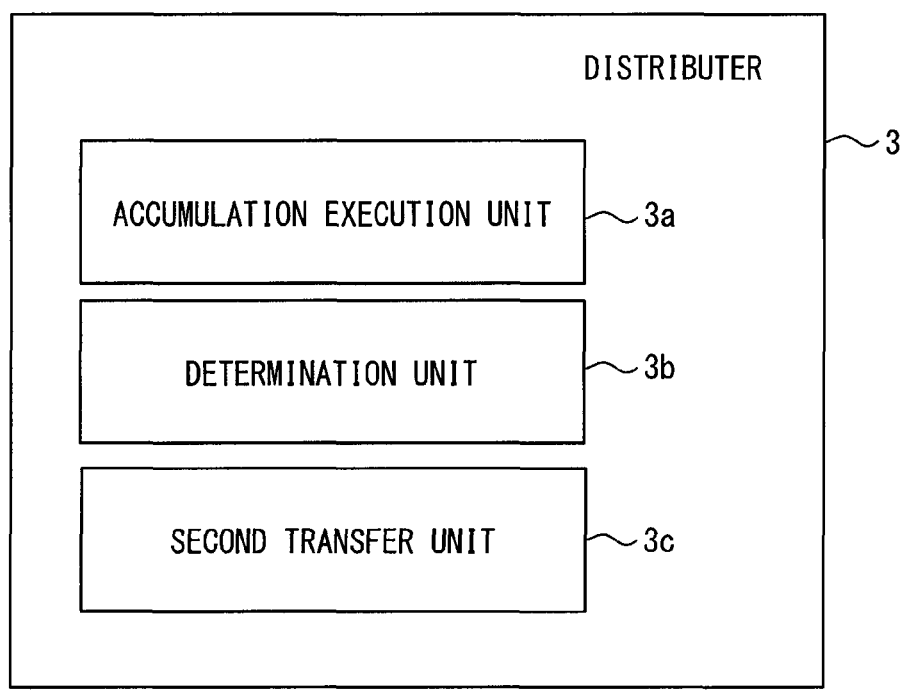
FIG. 5 is a diagram showing a configuration of a distributor.
Figure 6:
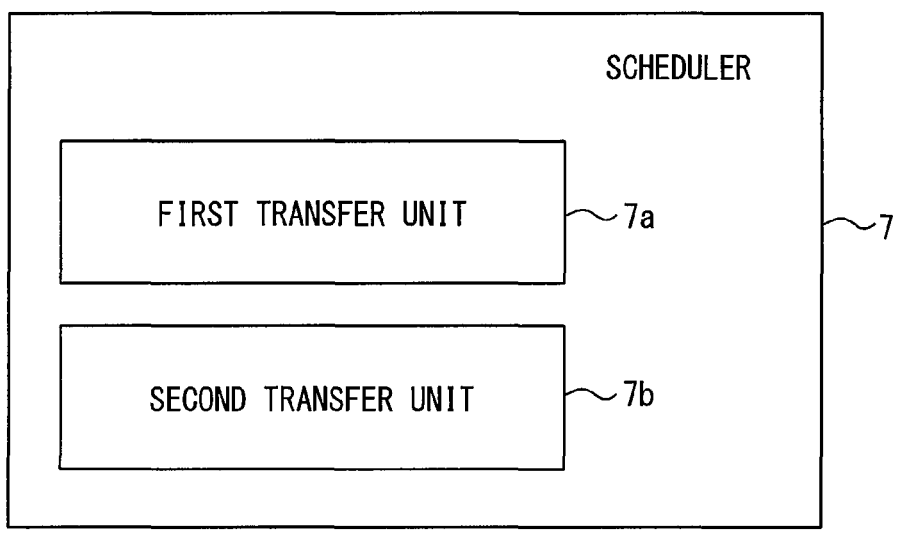
FIG. 6 is a diagram showing a configuration of a scheduler.

The distributor 3 includes an accumulation execution unit 3a, a determination unit 3b, and a second transfer unit 3c as shown in FIG. 5. The scheduler 7 includes a first transfer unit 7a and a second transfer unit 7b as shown in FIG. 6.

Each unit in the distributor 3 and the scheduler 7 may be realized by, for example, a digital circuit or an analog circuit, or a combination of a digital circuit and an analog circuit. Each unit in the distributor 3 and the scheduler 7 may also be realized using one or more microcomputers having a CPU (processor) and a semiconductor memory such as a RAM or a ROM. In such a case, functions of the distributor 3 and the scheduler 7 are realized by the CPU executing a program stored in a non-transitional tangible storage medium, and the semiconductor memory corresponds to the non-transitory tangible storage medium in which the program is stored. By executing the program, a method corresponding to the program is executed.

2. Processing Executed by Distributor

Next, a processing executed by the distributor 3 will be described with reference to the flowchart in FIG. 2. The distributor 3 executes the processing in FIG. 2 when a frame is input to any of the reception ports P0R-P5R.

Figure 2:
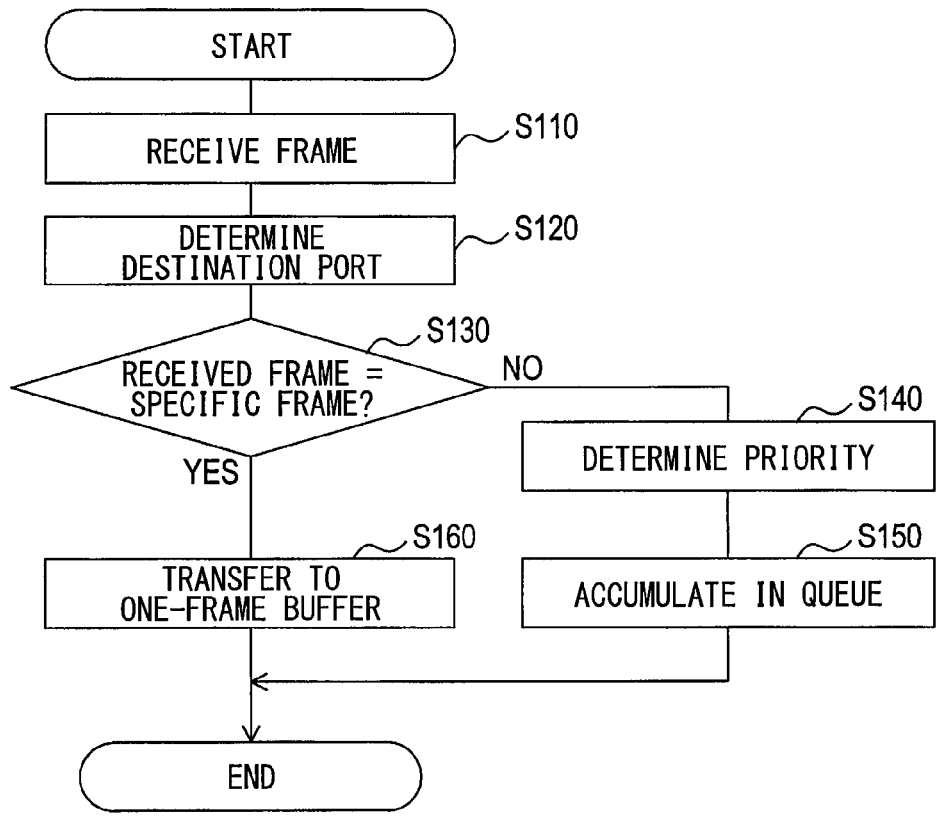
FIG. 2 is a flowchart showing a processing executed by a distributor.

As shown in FIG. 2, the distributor 3 receives a frame from any of the reception ports P0R-P5R at S110. Then, the distributor 3 determines a transfer destination port of the received frame by a method based on the standard of Ethernet at S120. The received frame is the frame that is received. By the process at S120, among the transmission ports P0T-P5T, the transmission port connected to the ECU that is the destination of the reception frame is determined as the transfer destination port.

At S130, the distributor 3 determines whether the received frame is a predetermined specific frame. The specific frame will be described later. When the distributor 3 determines at S130 that the received frame is not the specific frame, the processing proceeds to S140 and determines the priority of the received frame.

For example, frames other than the specific frame include a frame in which traveling data used to control a traveling of a vehicle is included as data to be communicated (hereinafter referred to as a traveling frame), and a frame in which data other than the traveling data is included as data to be communicated (hereinafter referred to as a non-traveling frame). The traveling frame is set to have a higher priority than the non-traveling frame. Thus, the distributor 3 determines whether the received frame is the traveling frame or the non-traveling frame, that is, whether the priory of the received frame is high or low, based on, for example, data type information arranged in a payload (that is, a data main body section) in the received frame.

At S150, the distributor 3 stores the received frame in one of the queues Q1 and Q2 of the buffer unit corresponding to the transfer destination port determined at S120, which corresponds to the priority determined at S140. Therefore, the traveling frame with high priority is stored and accumulated in the first queue Q1, and the non-traveling frame with low priority is stored and accumulated in the second queue Q2. After executing the processing at S150, the distributor 3 ends the processing of FIG. 2.

On the other hand, when the distributor 3 determines at S130 that the received frame is the specific frame, the processing proceeds to S160 without executing the processing at S140. Then, at S160, the distributor 3 transfers the received frame to the one-frame buffer 5 in the buffer unit corresponding to the transfer destination port determined at S120 and stores the received frame, and thereafter ends the processing of FIG. 2.

3. Processing Executed by Scheduler

Next, a processing executed by the scheduler 7 in each of the buffer units B0-B5 will be described using the flowchart of FIG. 3.

Figure 3:
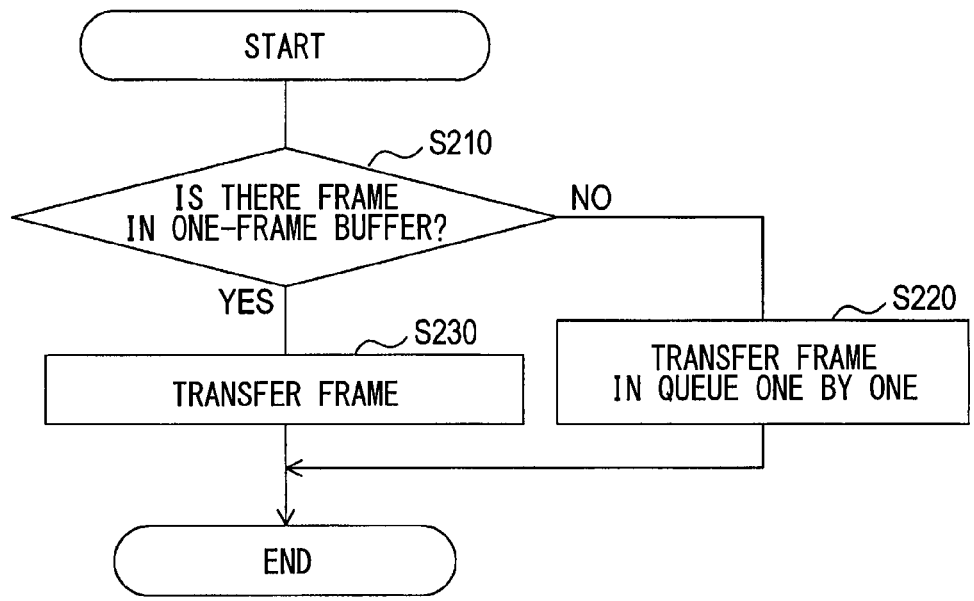
FIG. 3 is a flowchart showing a processing executed by a scheduler.

The processing of FIG. 3 is executed as soon as the processing of FIG. 2 ends. In addition to immediately after the processing of FIG. 2 ends, the processing of FIG. 3 is executed in parallel with the processing of FIG. 2 during the frames are accumulated in the queues Q1, Q2 in the buffer unit provided with the scheduler 7.

As shown in FIG. 3, the scheduler 7 determines at S210 whether a frame (that is, the specific frame) is stored in the one-frame buffer 5. When the scheduler 7 determines that the frame is stored in the one-frame buffer 5, the processing proceeds to S230. The one-frame buffer 5 referred to here is the one-frame buffer 5 in the buffer unit provided with the scheduler 7 among the buffer units B0-B5.

Then, at S230, the scheduler 7 outputs the frame in the one-frame buffer 5 from the transmission port corresponding to the scheduler 7 in order to transfer the frame to the destination of the frame, and then the processing of FIG. 3 ends. The transmission port corresponding to the scheduler 7 is the transmission port corresponding to the buffer unit provided with the scheduler 7 among the transmission ports P0T-P5T.

Therefore, the specific frame is not accumulated in the queues Q1 and Q2 and is transferred prior to the frames stored in the queues Q1 and Q2 by the processing at S160 of FIG. 2 and the processing at S210 and S230 of FIG. 3.

On the other hand, when the scheduler 7 determines at S210 that no frame is stored in the one-frame buffer 5, the processing proceeds to S220. Then, at S220, the scheduler 7 transfers the frames in the queues Q1 and Q2 one by one based on a predetermined schedule rule. The queues Q1 and Q2 referred to here are the queues Q1 and Q2 in the buffer unit provided with the scheduler 7 among the buffer units B0-B5. Specifically, the scheduler 7 extracts the frame in the queues Q1 and Q2 one by one according to the predetermined schedule rule, and outputs the extracted frame from the transmission port corresponding to the scheduler 7. The frames with high priority accumulated in the first queue Q1 are transferred priority to the frames with low priority accumulated in the second queue Q2 according to the predetermined schedule rule. According to one example of the schedule rule, after two frames are extracted from the first queue Q1, one frame is extracted from the second queue Q2. According to another example of the schedule rule, after all frames in the first queue Q1 are extracted, frames are extracted from the second queue Q2.

Then, after executing the processing at S220, the scheduler 7 ends the processing of FIG. 3.

Note that, in the present embodiment, the accumulation execution unit 3a in the distributor 3 executes the processing at S150. The first transfer unit 7a in the scheduler 7 executes the processing at S220. The determination unit 3b in the distributor 3 executes the processing at S130. The second transfer unit 3c in the distributor 3 executes the processing at S160, and the second transfer unit 7b in the scheduler 7 executes the processing at S210 and S230. The one-frame buffer 5 corresponds to a buffer capable of storing the specific frame.

4. Frame Configuration and Type of Specific Frame

In the present embodiment, the specific frame is a time synchronization frame for time synchronization between a plurality of ECUs. As described above, a transmission side ECU puts a time stamp indicating a current time in the time synchronization frame. A reception side ECU recognizes the current time from the time stamp in the received time synchronization frame. As described above, inconvenience occurs when a transfer delay time of the time synchronization frame varies.

Figure 4:
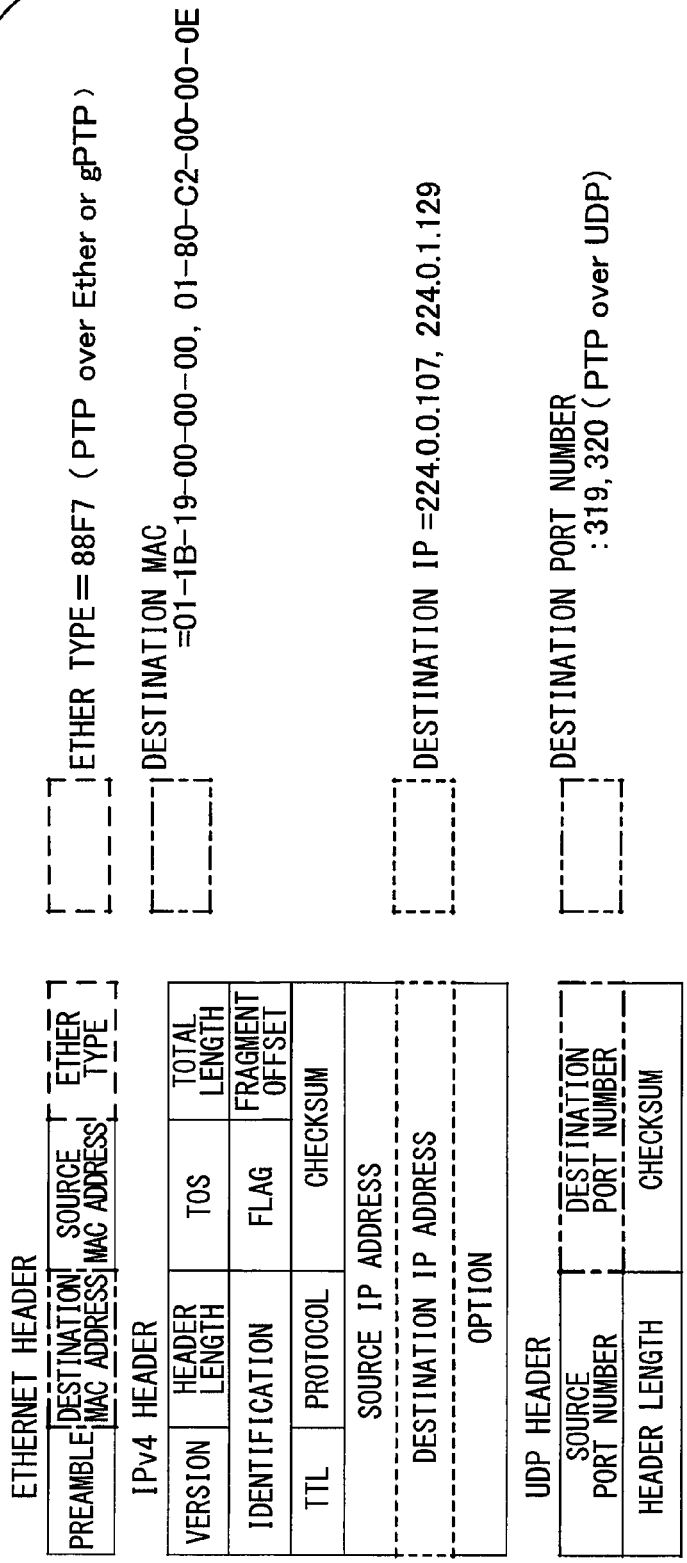
FIG. 4 is a diagram for explaining a frame structure and a specific frame.

As shown in FIG. 4, headers in an Ethernet frame includes an Ethernet header, an IP header, and an UDP header. Details of information included in each header are known and as shown in FIG. 4. The IP header shown in FIG. 4 is an IPv4 header in detail.

The specific frame may be at least one frame selected from among the following frames <a> to <g>. The following frames <a> to <g> are frames that can be used as time synchronization frames in an Ethernet communication system.

<a> A frame in which a type number (that is, an Ether TYPE) included in an Ethernet header is "88F7"
<b> A frame in which a destination MAC address included in an Ethernet header is "01-1B-19-00-00-00"
<c> A frame in which a destination MAC address included in an Ethernet header is "01-80-C2-00-00-0E"
<d> A frame in which a destination IP address included in an IP header is "224.0.0.107"
<e> A frame in which a destination IP address included in an IP header is "224.0.1.129"
<f> A frame in which a destination port number (that is, an UDP port number) included in an UDP header is "319"
<g> A frame in which a destination port number included in an UDP header is "320"

For example, in a case where the frame <a> is the specific frame, the distributor 3 is configured to determine at S130 in FIG. 2 whether the type number included in the received frame is "88F7". In a case where the frame <b> is the specific frame, the distributor 3 is configured to determine at S130 in FIG. 2 whether the destination MAC address included in the received frame is "01-1B-19-00-00-00". Each of the frames <c> to <g> may be determined similarly.

5. Effects

In the relay device 1 according to the above-described embodiment, the frames other than the specific frame are accumulated in the queues Q1 and Q2 and then transferred one by one. On the other hand, the specific frame is transferred immediately after being received without being accumulated in the queues Q1 and Q2.

Thus, the relay device 1 can restrict a variation in transfer delay time of the specific frame. The transfer delay time of the frames other than the specific frame may vary depending on the amount of frames accumulated in the queues Q1 and Q2. On the other hand, since the specific frame is immediately transferred without being accumulated in the queues Q1 and Q2, the variation in transfer delay time is restricted. Therefore, if the time synchronization frame is set as the specific frame, the relay device 1 can easily realize correct time synchronization between the ECUs.

Further, the specific frame is temporarily stored in the one-frame buffer 5 different from the queues Q1 and Q2 at S160 in FIG. 2 and is immediately transferred to the destination at S230 in FIG. 3. Therefore, the specific frame can be transferred without being accumulated in the queues Q1 and Q2. Even if the specific frame is a long frame, the frame can be transmitted with certainty. Furthermore, since the above-described frames <a> to <g> are frames that can be used as the time synchronization frames in the Ethernet communication system, any of the frames <a> to <g> may be set as the specific frame.

6. Other Embodiments

While the embodiment of the present disclosure has been described above, the present disclosure is not limited to the above embodiment and can be variously modified as exemplified below.

For example, the number of queues provided for each of the transmission ports P0T-P5T is not limited to two, and may also be one or more than two. The protocol of the communication system to which the relay device 1 is applied may also be a protocol other than Ethernet. The relay device 1 may also be configured to transfer the specific frame to the destination without passing through the one-frame buffer 5.

A plurality of functions of one element in the above embodiment may be realized by a plurality of elements, or one function of one element may be realized by a plurality of elements. A plurality of functions of a plurality of elements may be realized by one element, or one function realized by a plurality of elements may be realized by one element. A part of the configuration of the above embodiment may be omitted.

In addition to the relay device 1 described above, various features such as a communication system having the relay device 1 as a component, a program for making a computer function as the delay device 1, a non-transitory tangible storage medium such as a semiconductor memory in which the program is stored, and a method of relay may be provided to realize the present disclosure.

What is claimed is:

1. A relay device configured to transfer a plurality of frames that is received, comprising:
   a queue capable of storing more than one frame in the plurality of frames assigned with a priority and distributed in accordance with the priority;
   an accumulation execution unit configured to distribute and accumulate the plurality of frames that is received in the queue;
   a first transfer unit configured to transfer the plurality of frames accumulated in the queue one by one according to a predetermined rule;
   a determination unit configured to determine whether each of the plurality of frames that is received is a specific frame;
   a second transfer unit configured to prohibit the accumulation execution unit from accumulating the specific frame in the queue and transfer the specific frame with a higher priority than the plurality of frames accumulated in the queue; and
   a buffer capable of storing the specific frame,
   wherein the second transfer unit is configured to store the specific frame in the buffer and transfer the specific frame stored in the buffer with the higher priority than the plurality of frames accumulated in the queue, and
   wherein the buffer is a one-frame buffer.

2. The relay device according to claim 1, wherein the specific frame is a time synchronization frame for time synchronization between a plurality of electronic control units.

3. The relay device according to claim 1, wherein each of the plurality of frames is an Ethernet frame, and the specific frame is at least one frame selected from among:
   a frame in which a type number included in an Ethernet header is "88F7";
   a frame in which a destination MAC address included in an Ethernet header is "01-1B-19-00-00-00" or "01-80-C2-00-00-0E";
   a frame in which a destination IP address included in an IP header is "224.0.0.107" or "224.0.1.129"; and
   a frame in which a destination port number included in an UDP header is "319" or "320".

4. The relay device according to claim 1, wherein:
   the queue is a plurality of queues,
   the accumulation execution unit distributes and accumulates each frame of the plurality of frames, according to the priority, among the plurality of queues, and
   prior to second transfer unit transferring the specific frame, the specific frame is stored in the buffer, which is separate from the plurality of queues.

5. A relay device comprising:
   a reception port configured to receive a plurality of frames from a first electronic control unit;
   a transmission port configured to transfer the plurality of frames to a second electronic control unit;
   a queue connected between the reception port and the transmission port and capable of storing more than one frame in the plurality of frames assigned with a priority and distributed in accordance with the priority;
   a processor; and
   a non-transitory tangible storage medium storing a program that instructs the processor to:
      receive the plurality of frames from the reception port;
      determine whether each of the plurality of frames is a time synchronization frame;
      distribute and accumulate the plurality of frames other than the time synchronization frame in the queue;
      transfer the time synchronization frame from the transmission port with a higher priority than the plurality of frames accumulated in the queue without accumulating the time synchronization frame in the queue;
      transfer the plurality of frames accumulated in the queue from the transmission port one by one according to a predetermined rule,
   wherein the relay device further comprises a buffer,
   wherein the program instructs the processor to:
      store the time synchronization frame in the buffer; and
      transfer the time synchronization frame stored in the buffer from the transmission port with the higher priority than the plurality of frames accumulated in the queue, and
   wherein the buffer is a one-frame buffer.

6. The relay device according to claim 5, wherein the relay device is mounted in a vehicle,
   the queue includes a first queue and a second queue,
   the plurality of frames other than the time synchronization frame includes a traveling frame in which traveling data used to control a traveling of the vehicle is included as data to be communicated, and a non-traveling frame in which data other than the traveling data is included as data to be communicated, and
   the program instructs the processor to:
      distribute and accumulate the traveling frame in the first queue and distribute and accumulate the non-traveling frame in the second queue; and
      transfer the traveling frame accumulated in the first queue from the transmission port with a higher priority than the non-traveling frame accumulated in the second queue according to the predetermined rule.

7. The relay device according to claim 5, wherein:
   the queue is a plurality of queues,
   the program further instructs the processor to;
      distribute and accumulate each frame of the plurality of frames, according to the priority, among the plurality of queues, and
      prior to transferring the time synchronization frame, store the time synchronization frame in the buffer, which is separate from the plurality of queues.

* * * * *